United States Patent [19]
Oseroff et al.

[11] 3,848,480
[45] Nov. 19, 1974

[54] HAND GRIPS

[76] Inventors: Herbert B. Oseroff, 9800 Bay Harbor Dr., Bay Harbor Islands, Fla. 33154; William J. Sparks, 5129 Granada Blvd., Coral Gables, Fla. 33146

[22] Filed: Feb. 5, 1973

[21] Appl. No.: 329,944

[52] U.S. Cl............... 74/558.5, 74/551.9, 273/75, 273/81.5, 273/81.6
[51] Int. Cl............................................. G05g 1/04
[58] Field of Search ....... 74/558.5, 558, 551.9, 543; 43/18 R; 273/75, 81.5, 81.6

[56] References Cited
UNITED STATES PATENTS

| | | | |
|---|---|---|---|
| 499,103 | 6/1893 | Goddard | 74/551.9 |
| 583,781 | 6/1897 | Barber | 74/551.9 |
| 1,632,227 | 6/1927 | Halsey | 74/558.5 |
| 1,731,173 | 10/1929 | Pope | 43/18 R |
| 2,282,419 | 5/1942 | Hall | 273/75 |
| 3,312,124 | 4/1967 | Meier et al. | 74/558.5 X |

FOREIGN PATENTS OR APPLICATIONS 443,228  2/1936  Great Britain ..................... 273/81.6

*Primary Examiner*—Samuel Scott
*Assistant Examiner*—F. D. Shoemaker
*Attorney, Agent, or Firm*—Meredith P. Sparks

[57] ABSTRACT

An improved grip for encircling the hand contact portion of a shaft, lever, or steering device for hand powered and hand guided equipment is made from a reversible thermoplastic rubber that is designed for use without vulcanization. The improved grip finds application whenever it is desirable that the hand grip be securely grasped and held, and especially when impact of a ball with a club or racquet is with sufficient force that it injures the hand. It is particularly useful in tape form for bicycles and motorcycles.

5 Claims, 6 Drawing Figures

PATENTED NOV 19 1974 3,848,480

THERMOPLASTIC RUBBER
DUROMETER HARDNESS 35-50
TEAR RESISTANCE 120-175
MODULUS (300%) 100-400

HAND GRIPS

This invention relates to an improved grip for encircling the hand contact area of a shaft, lever, or steering device for hand powered and hand guided equipment. More particularly, this invention relates to grips for hand operated devices of this kind which are made from a reversible thermoplastic rubber material that is designed for use without vulcanization. This invention relates especially to grips which are formed by spiral winding extruded tapes of this thermoplastic material on the shaft, lever or steering device, but also includes grips which are made by molding processes.

Hand powered implements and hand guided equipment are often controlled by direct manual contact of the hand with an operating shaft, lever or wheel. Many times the manual control area is covered by a superimposed layer of a material having a different composition from the equipment itself. The grips of this invention encircle at least a portion of the hand operated device for control of hand powered or hand operated equipment in which the handle portion of the device may be of any shape, including a shaft or bar which is straight, tapered or curved, and including steering wheels which form an annular ring.

The grips of this invention are particularly useful for bicycles and motorcycles; on guiding wheels for an automobile, boat, or other motor powered equipment; on the hand power rim of a wheel chair or other hand powered medical device; and for the steering levers for outboard motors. The grip of this invention is also useful for encircling the manual control area of equipment such as clubs, racquets and the like used in various sports and games such as golf, tennis, table tennis, baseball, field hockey, ice hockey, lacrosse and squash; for fishing poles, ski poles and the like; and for tools such as a hatchet hammer, broom, or policeman's billy club, which implements are used to transmit power through a shaft to an operating head. The improved grip finds application whenever it is desirable that the hand grip be securely grasped and held, and especially when the impact of the ball with a club or racquet, for example, is with sufficient force that it may cause blisters or callouses on the hand.

Grips formed by spirally winding the handle bars of bicycles or motorcycles with tapes made of the reversible thermoplastic material according to this invention are especially desirable for comfortable cycling. It is well known that numbness of the hands and fingers is an invariable result of long distance cycling. The problem is that nerves lying in close proximity to the bones of the bicyclist are being compressed by the constant pressure from the handle bars. This in turn is greatly aggravated by the additional compression caused by sudden transmitted road shock. The soft grip of this invention greatly alleviates this problem.

According to this invention, grips are made from a reversible thermoplastic rubber material which is designed for use without vulcanization. These elastomeric materials differ fundamentally in chemical structure from the typical plastics or rubber of commerce, which is a homopolymer or random copolymer. The new rubbers are block copolymers which consist essentially of three blocks in the configuration A-B-A where A represents an amorphous polymer which has a glass transition temperature above room temperature, i.e., a thermoplastic, and B represents an amorphous polymer which has a glass transition temperature well below room temperature, i.e., a rubber. Thus they have an elastomeric block in the center and a thermoplastic block on each end. Where the thermoplastic end-blocks are in minor proportion, they associate together to form discrete particles. These particles act as cross-links for the elastomeric center-blocks. The resulting network is thus held together by reversible physical bonds in contrast with the permanent chemical bonds found in vulcanized elastomers.

The A-B-A structure is the basis for their unique properties. Since the thermoplastic end-blocks and the elastomeric mid-blocks are mutually incompatible, the bulk polymer separates into two micro-phase regions. Where the end-blocks are in minor proportion, they coalesce, when cooled from a melt, to form sub-microscopic particles of thermoplastic material. These particles, held together by van der Waals forces, form a discrete phase while the elastomeric mid-blocks form a continuous phase.

In order to achieve usable strength through chemical crosslinking, conventional elastomers must be combined with sulfur accelators, fillers and other modifiers or curatives. Block copolymers derive their strength from physical cross-links rather than chemical cross-links and, therefore, the vulcanizing step is not required. The result is a much purer and cleaner finished product that is subjected to far less handling than conventional rubber.

The block copolymers are commonly available in commerce as styrene-butadiene types and styrene-isoprene types. In current commercial polymers block A represents a polystyrene chain and block B represents a polydiene (elastomeric) chain of either polybutadiene or polyisoprene. Ethylene-propylene block copolymers are also known. Other chemical types may be developed. However, this invention is not limited by the chemical composition of the block copolymer, but by their physical properties.

The products used in this invention are reversible thermoplastic rubbers which are resilient materials that combine the properties of vulcanized elastomers with the processing advantages of thermoplastics. They form free-flowing melts when subjected to heat and pressure, and on cooling, solidify to give articles conforming to the mold or die shape. The resulting products have physical properties which are essentially indistinguishable from vulcanized elastomers.

One of the principal advantages offered is the ability to be processed on conventional thermoplastic processing equipment. The finished rubbery parts can be produced at low cost by the high speed operations of thermoforming or extrusion rather than by vulcanization on molding.

Certain of these block copolymers provide a useful range of properties for making grips for the handle portions of hand operated and hand powered equipment. The temperature dependence of the physical cross-links of block copolymers allows them to soften and flow under shear upon heating, and yet recover their structure and elastomeric properties on cooling. Thus they are suited for the formulation of hot-melt or extrusion applications.

A most important physical contact between man and the outside world is through the human hand. The application of force through the hand is manual. The relation between the hand and the force-accepting structure is tactile. Within a narrow range of surface layer hardness, both the hand and the surface layer are deformed on contact. Since surfaces are characterized by rugosity, a change in surface due to manual distortion is tactile rugosity. It is this phenomenon of tactile rugosity which gives rise to "feel". Feel is the sensitivity factor through which individuals vary greatly in manual dexterity. Feel, which is so important in arts, crafts and sports, is, therefore, a matching of the force-transmitting layers of the hands with force-accepting layers of outside objects. It has been recognized that hand sensitivity for hard steel as compared with soft iron is poor, whereas the hands are very sensitive to touch with other parts of the body. There is then an upper range of maximum manual and tactile sensitivity. Using the Shore A durometer hardness test, the optimum hardness from a force accepting standpoint is from about 35 to about 50 Shore A hardness. It is interesting that these considerations have been generally absent in the design of hand-surface contacts. This is especially true since we have determined experimentally that all individuals like the feel of an outside deformable layer when it has a hardness of about 35 to 50. The Shore A hardness is measured in this instance by ASTM standard D2240-68.

In addition to hardness, the grip must have tear resistance and strength, especially when the grip is formed by tapes which are spirally wound. Since the tapes are often sold separately and applied to a bicycle handle bar, for example, which in usage may have rough treatment due to falls and scrapes that cause nicks and tears in the tapes, the grip material must have good tear resistance. Tear resistance is also important during the process of winding the tape on the handle bar since tear resistance is affected by mechanical handling of the rubber under stress, speed of stretching and other operations to which the tapes may be subjected, for example, during handling, shipping, or winding on the handle bar or shaft. Tear resistance is measured according to ASTM standard D624-70 which covers methods using three independent specimen shapes, two of which are razornicked before testing. Thermoplastic rubber suitable for this invention will show tear resistance values of about 120 to 175 pounds pull in the ASTM test method.

The rubber material used for the grip must also have strength which is related to the modulus figures obtained following the procedures of ASTM standard D2433-70 where the elongation at break of a rubber thread of the material is determined. The stress at predetermined elongation is determined in pounds per square inch calculated on the orginal cross-sectional area at a specified elongation measured on extension and retraction of a massaged thread. Thermoplastic rubber suitable for the grips of this invention will show value of at least 100 and up to about 400 at 300 percent elongation.

The following Table I shows the hardness, tear resistance and modulus of several block copolymers sold commercially which have physical properties within the above specified ranges.

TABLE I

| | HARDNESS | TEAR RESISTANCE | 300% MODULUS, psi |
| --- | --- | --- | --- |
| 1107 | 37 | 120 | 100 |

TABLE I-Continued

| | HARDNESS | TEAR RESISTANCE | 300% MODULUS, psi |
| --- | --- | --- | --- |
| 3226* | 38 | 115 | 275 |
| 2104 | 43 | 180 | 200 |
| 4113 | 44 | | 250 |
| 3226** | 45 | 175 | 300–500 |

*molded
**extruded

The above numbers refer to product numbers of KRATON rubber sold by the Shell Chemical Co., Houston, Texas.

A fuller understanding of the invention may be had by referring to the following description and claims taken in conjunction with the accompanying drawings.

Figure 1:
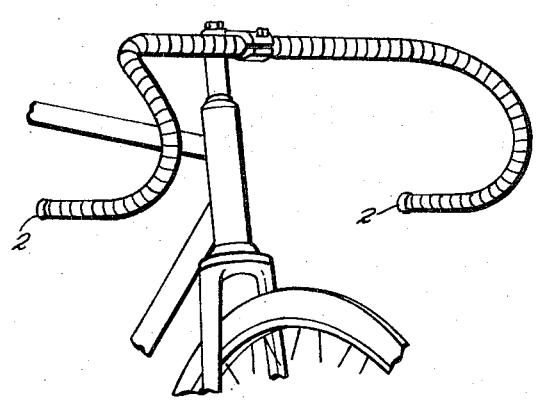
FIG. 1 is a perspective view showing the handle bar of a bicycle on which a grip is formed by winding a tape made of the reversible thermoplastic rubber of FIG. 5, the tape being fastened at each end.

As shown in FIG. 1 the tape is spirally wound around the entire handle bar and secured at each end with a fastening means 2. On the handle bar of the bicycle space may be provided between adjacent spiral windings of the tape for the attachment of additional equipment, such as brakes on the handle bar.

Figure 2:
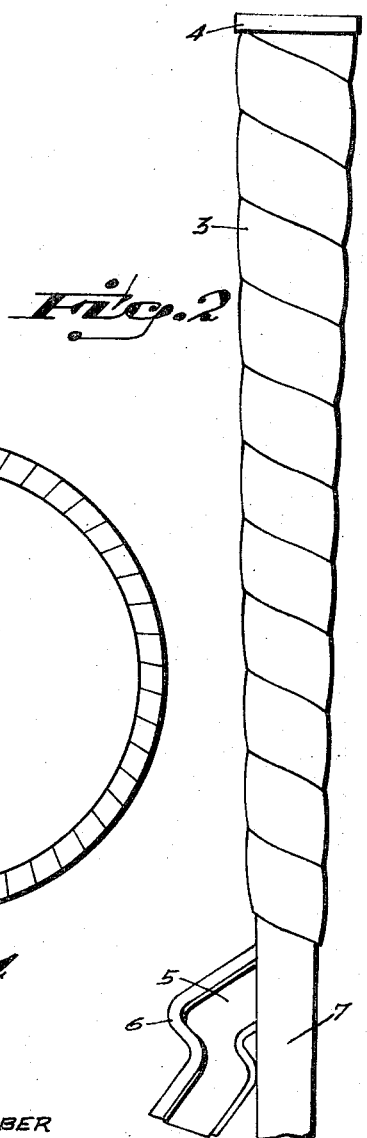
FIG. 2 is an elevational view of the top portion of a tapered shaft, such as a golf club, on which the grip is formed by spiral winding of a tape of the thermoplastic rubber of FIG. 5.

In FIG. 2 the tapered shaft is spirally wound with a tape 3 which is secured at the top with a cap 4. The underside 5 of the tape is shown at the lower end of the shaft to illustrate a beveled edge 6 which is provided for overlapping of adjacent strips of the tape when spirally wound around the shaft 7.

Figure 3:
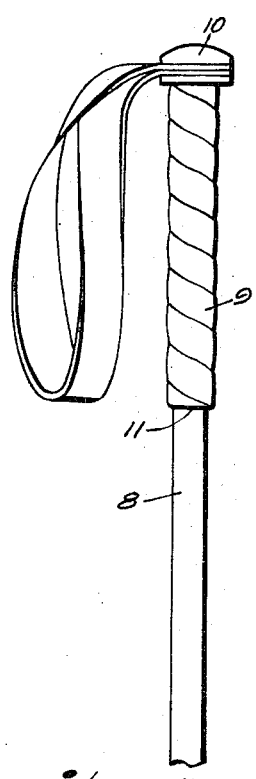
FIG. 3 is an elevation view of a grip encircling a straight shaft which forms the top of a pole, the grip being formed by spiral winding of a tape of the thermoplastic rubber of FIG. 5.

In FIG. 3 a straight shaft 8 is spirally wound with a tape 9 which is fastened at the top with a cap 10 and secured at the lower end by suitable means 11.

Figure 4:
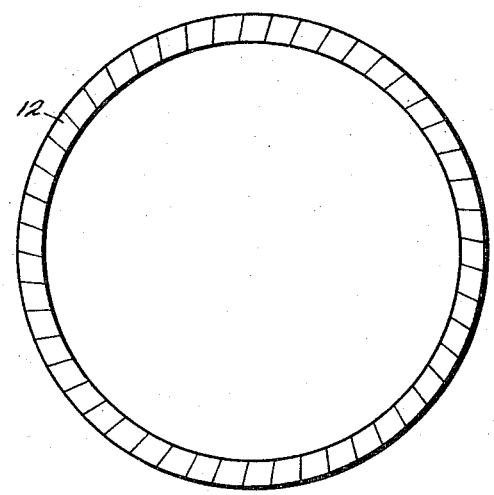
FIG. 4 is a top plan view of a rubber jacketed wheel rim, the grip being formed by spiral winding of a tape of the thermoplastic rubber of FIG. 5.

In FIG. 4 a wheel rim which may be used, for example, as an automobile steering wheel or for guiding a boat, is wound with tape 12. Spaces may occur between adjacent spiral windings of the tape for spokes and the like attached to the rim of the wheel.

Figure 5:
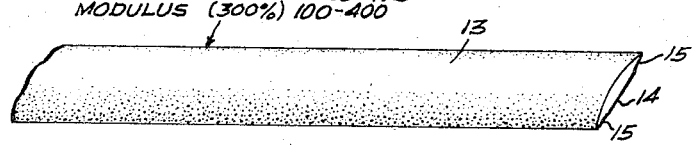
FIG. 5 is a perspective view of a tape made of thermoplastic rubber having the specifications defined in this invention, one end of the tape being broken away.

FIG. 5 is a perspective view of a tape made of thermoplastic rubber having the specifications defined in this invention.

Figure 6:
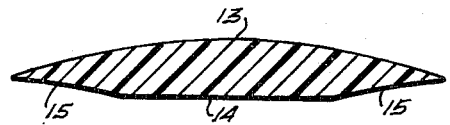
FIG. 6 is a cross-sectional view of the tape of FIG. 5.

FIG. 6 is a cross-sectional view of the tape of FIG. 5 which has a generally rounded curvature at the top 13, a flat bottom 14, and angular cuts 15 at each side so as to permit overlapping of adjacent strips of the tape without substantially increasing the thickness at the overlapped portion.

The block copolymers useful for this invention may exhibit flow orientation effects when extruded or processed under high shear rates. Likewise any longitudinal pull on a tape made from this material may introduce a strain which will manifest itself in less strength of the spirally wound grip. However, if a longitudinal pull is exerted on the material of the hand grip, the tendency will be for the internal diameter of the grip to be reduced, and obviously any reduction in the internal diameter will serve to materially increase the frictional resistance between the inner surface of the grip and the outer surface of the bar on which the grip is mounted so that the grip more firmly engages the handle bar.

If the grip is formed by spiral winding under tension, the strain may result in less over-all strength in usage. We have discovered that strains and orientation effects can be overcome effectively by heat treating the grip at a temperature of about 50° to 100°C for about 2 to 10 minutes. The length of time of heating, of course, varies inversely with the increase in temperature. This temperature is much less than the melt temperatures used for extrusion which are generally in the range of 275° to 400°C. Heating may be accomplished by any suitable means, such as hot water, electrical means, and the like.

The block copolymers used in this invention are compatible with a wide variety of resins, polymers, plasticizers and other ingredients. The properties of these mixtures, such as tack, stiffness, softening temperature or cohesive strength, may be varied over wide ranges. With block copolymers there are two phases which can interact with additives. Thus an equilibrium will be established among the additive, the rubber network and the thermoplastic domains.

These plastics can be made sufficiently transparent that it is possible to add a phosphorescent material to the plastic and obtain a hand grip which glows in the dark. When using ordinary rubber or synthetic rubber, the addition of phosphorescent material has very little, if any, effect due to the opaqueness of the rubber. This will provide a material which is luminous in the dark so as to serve as a safety feature.

The grip may be molded to any suitable size and shape to fit on the handle bar, shaft, or steering mechanism. A molded grip is usually not practical when the hand operated device is curved, bent or interrupted by cross bars, brakes of other mechanisms. Therefore it is an advantage of this invention that the reversible thermoplastic rubber material may also be extruded and used as a tape.

a molded slip-on grip will save labor, because it is slipped on, and not wound on. Sheath grips also take less time and skill to apply. However, in a golf club, for example, a slip-on grip will yield or give, however slightly, at the high speed impact of club on the ball. But if the grip which has been spirally-wound under tension is installed, it cannot be twisted the same way. It is unyielding and, therefore, transmits, a completely solid hit. Many persons prefer a spirally wound grip for this reason.

The tape used may be of any suitable dimension, taking in consideration the size of the object, its curvature, interruptions, and the like. Tapes generally vary in size from about 1–3 centimeters wide and from about 10 to 50 millimeters in thickness. Tapes sold for bicycle grips are preferably about two centimeters wide and about 30 mm tick. Preferably each edge is beveled lengthwise, as shown in FIGS. 2 and 5 for a distance of about 30 mm from each edge, to provide for overlapping of adjacent strips when the tape is spirally wound around the handle bar.

Various modifications and variations of the present invention may be made without departing from the spirit of the discovery or the scope of the appended claims.

We claim:

1. In a hand operated device for hand powered and hand guided equipment having
    a rigid handle means in the form of an operating shaft or steering mechanism, and
    a gripping element encircling at least a portion of said handle means, the improvement wherein said gripping element is formed from a reversible thermoplastic rubber having the properties:
    1. Shore A hardness in the range of about 35 to about 50, as determined by ASTM standard D2240-68;
    2. Tear resistance of about 120 to about 175 pounds pull, as determined by ASTM standard D624-70; and
    3. Modulus at 300 percent elongation in the range of about 100 to about 400 pounds per square inch pull, as determined by ASTM standard D2433-70.

2. The improvement defined in claim 1 wherein said grip element is in the form of a tape spirally wound around said handle means.

3. A process for making the gripping element for the hand control area of a hand operated device for hand powered and hand guided equipment which comprises the steps of
    a. extruding in tape form an reversible thermoplastic rubber material having the following properties:
       1. Shore A hardness in the range of about 35 to about 50, as determined by ASTM standard D2240-68;
       2. Tear resistance of about 120 to about 175 pounds pull, as determined by ASTM standard D624-70; and
       3. Modulus at 300 percent elongation in the range of about 100 to about 400 pounds per square inch pull, as determined by ASTM standard D2433-70;
    b. winding said tape spirally around the hand control area of said hand operated device to form a gripping element; and
    c. securing each end of said tape to said hand device by suitable means.

4. The process of claim 3 wherein said gripping element in step (c) is heat treated at about 50° to 100°C for about 2 to about 10 minutes to substantially reduce the orientation and strain effects brought about during extruding, or by tension on winding.

5. The process of claim 3 wherein a phosphorescent material is added to said rubber material before extruding in step (a) with the result that said tape will glow in the dark.

* * * * *